(12) United States Patent
Palin

(10) Patent No.: US 7,580,005 B1
(45) Date of Patent: Aug. 25, 2009

(54) DISPLAY CHANGE BETWEEN MOBILE TERMINAL DISPLAY AND EXTERNAL DEVICE DISPLAY

(75) Inventor: Arto Palin, Lempäälä (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 09/639,196

(22) Filed: Aug. 15, 2000

(51) Int. Cl.
*G09G 5/00* (2006.01)
(52) U.S. Cl. .......................... 345/1.1; 345/1.2; 345/2.1; 345/2.3
(58) Field of Classification Search ................. 340/5.61, 340/825.72; 345/2, 352, 1.1, 1.2, 2.1, 2.3; 455/550, 576, 41.2, 41.3, 556, 557, 566; 370/473, 474, 476; 348/552, 555; 715/716–718, 715/961
See application file for complete search history.

(56) References Cited

U.S. PATENT DOCUMENTS

| | | | | |
|---|---|---|---|---|
| 5,307,055 | A * | 4/1994 | Baskin et al. ................. | 345/2.2 |
| 5,550,593 | A * | 8/1996 | Nakabayashi | |
| 5,666,159 | A * | 9/1997 | Parulski et al. ............ | 348/211.2 |
| 5,734,413 | A * | 3/1998 | Lappington et al. .......... | 725/141 |
| 5,831,664 | A * | 11/1998 | Wharton et al. | |
| 5,850,340 | A | 12/1998 | York ............................ | 364/188 |
| 5,880,732 | A * | 3/1999 | Tryding ....................... | 345/810 |
| 6,002,450 | A | 12/1999 | Darbee et al. ................. | 348/734 |
| 6,064,420 | A * | 5/2000 | Harrison et al. .............. | 725/136 |
| 6,084,584 | A * | 7/2000 | Nahi et al. | |
| 6,097,441 | A * | 8/2000 | Allport ........................ | 348/552 |
| 6,122,526 | A * | 9/2000 | Parulski et al. ............ | 455/556.1 |
| 6,227,043 | B1 * | 5/2001 | Schoenbeck et al. .......... | 73/116 |
| 6,287,200 | B1 * | 9/2001 | Sharma | |
| 6,297,737 | B1 * | 10/2001 | Irvin | |
| 6,357,042 | B2 * | 3/2002 | Srinivasan | |
| 6,453,160 | B1 * | 9/2002 | Thomas et al. ............... | 455/419 |
| 6,496,122 | B2 * | 12/2002 | Sampsell ............... | 340/825.69 |
| 6,580,422 | B1 * | 6/2003 | Reilly ......................... | 345/169 |
| 6,611,358 | B1 * | 8/2003 | Narayanaswamy ........... | 358/442 |

(Continued)

FOREIGN PATENT DOCUMENTS

DE 197 19 908 A1 11/1998

(Continued)

OTHER PUBLICATIONS

EPC Article 96(2) Communication (dated Nov. 5, 2002) in EPO Application No. 01 660 146.0-1525.

*Primary Examiner*—Hau H Nguyen
(74) *Attorney, Agent, or Firm*—Locke Lord Bissell & Liddell LLP

(57) ABSTRACT

A system is provided for transmitting an image from a first display device having certain display capabilities to a second display device having different display capabilities. The image may be received by the first display device as data in a packet or plurality of packets. The packets are split by a splitting application into data to be displayed on the first display device, if any, and data to be displayed on the second display device. The data to be displayed on the second display device is reformatted at the first display device to be transmitted over a wireless, short range communication link, such as a Bluetooth link. The system thereby enables the display on the second display device of an image that either could not be displayed on the first display device or could not be displayed with the same capabilities as on the first display device.

16 Claims, 9 Drawing Sheets

U.S. PATENT DOCUMENTS

| | | | |
|---|---|---|---|
| 6,765,557 B1 * | 7/2004 | Segal et al. | 345/173 |
| 6,792,148 B1 * | 9/2004 | Wergeland et al. | 382/232 |
| 6,795,715 B1 * | 9/2004 | Kubo et al. | 455/556.1 |
| 6,968,365 B2 * | 11/2005 | Hollstrom et al. | 709/217 |

FOREIGN PATENT DOCUMENTS

| | | |
|---|---|---|
| EP | 0 426 966 A2 | 9/1990 |
| GB | 2 348 083 A | 9/2000 |
| WO | WO 98/16062 | 4/1998 |
| WO | WO 99/34564 | 7/1999 |
| WO | WO 99/34599 | 7/1999 |
| WO | WO 00/18025 | 3/2000 |

* cited by examiner

DISPLAY CHANGE BETWEEN MOBILE TERMINAL DISPLAY AND EXTERNAL DEVICE DISPLAY

BACKGROUND OF THE INVENTION

1. Field of the Invention

This invention relates to the field of showing images on different display devices, and particularly to display devices which have different capabilities for viewing the content.

2. Description of the Related Art

Messages may be transmitted over a wireless communications network to a mobile terminal, such as mobile phone, together with, or independently of an audio signal. The message may contain various types of content to serve various functions, that are already publicly available or are becoming available shortly. The content may consist of still pictures or video. These messages may be automatically sent to a recipient or there may be services which respond to a recipient's request for a specific service.

The display capabilities of currently available mobile terminals are limited because of the size and weight requirements on these compact devices. A mobile terminal display may be provided to view an incoming video signal, but because of the above mentioned facts, users would not enjoy watching multiformatted images or video on such a display. This problem with a small display is especially problematic for visually impaired people.

It is therefore desirable to find a way to view the content received with a mobile terminal on a separate display that has better display capabilities. A television receiver display or a computer monitor are examples of this kind of display having better display capabilities. Being able to display video sent over a mobile terminal on a larger display device, like a television display, would also allow a service provider to provide additional optional services to provide a user with added value, and avoid unnecessarily draining of the mobile terminal's battery by displaying the video on a separate display device that has a separate power source.

Recently, low power RF systems have been proposed for providing communications between a plurality of transceivers through a short range communications link. One such short range RF technology is currently under development and is referred to as "Bluetooth". This system will be commercially available in the near future and it operates in the open spectrum around 2.45 GHz. This unlicensed radio band, called Industrial, Scientific, Medical (ISM) band is globally available. The operating range of this RF system is approximately 10 meters for a normal power mode and has proven to be economically efficient. It is planned that a Bluetooth chip having these characteristics will be inserted in all kinds of electrical devices for enabling communication between separate devices. In PCT Application No. WO 0018025, such a Bluetooth link between a Bluetooth enabled mobile terminal and a Bluetooth enabled data terminal, such as a PC, is disclosed.

It would be particularly advantageous to enable the user to view the content, such as a video clip on a larger display, while the user is actually holding the mobile terminal, and allow the user to select what is viewed using the mobile terminal, or to otherwise use the mobile device while viewing the video clip. This would be best implemented using a wireless link between the mobile terminal and the external display device. U.S. Pat. No. 5,880,732 presents a method and apparatus enabling one specific type of usage of a remote display device connected to a mobile telephone. However, the invention offers only a partial solution to the problem, because the system allows only the textual message appearing on the telephone display to be viewed on the remote display. The system does not take into consideration the different displaying capabilities of the devices such as that the remote display may be capable of displaying images that the mobile telephone cannot, which makes the system inadequate for effective use.

SUMMARY OF THE INVENTION

It is therefore an object of this invention to present a system and method for wirelessly linking display devices having different display capabilities to provide better display quality to a user of a mobile terminal with an economic and efficient short range RF link.

This invention concentrates on providing better display quality to a user of a mobile device. The mobile device, such as a mobile phone, laptop computer, or personal digital assistant (PDA), may be provided with a Bluetooth chip conforming to the Bluetooth standards described in Bluetooth specification v.1.0B, and another display device, like a television apparatus in the vicinity of the mobile device, is likewise provided with a similar Bluetooth chip, thereby enabling a short range RF communications link between the two devices. The mobile terminal receives image data from a base station in a wireless communications network or from another device utilizing any transmission method, including, but not limited to GSM, EDGE, WCDMA, DAB, DVB or Bluetooth link. As used herein, the term "image" is used interchangeably with the term "video" and includes a single image, picture, or graphic, a stream or plurality of still pictures, or graphics, or a conventional video.

The system in this invention consists of a first display device and a second display device having a communication link between them. The communication link is arranged between said display devices by a short range RF communication link. The image on the first display is viewed as taking into consideration the capabilities of the first display device, and the image on the second display device is viewed as taking into consideration the different display capabilities of the second display device. This can be done by splitting the received payload at the first display device into a plurality of data packets with a specific splitting application and identifying the packets to first display device part(s) and second display device part(s), which takes into consideration the display capabilities of the first and second display devices.

The first display device also has means for establishing a first wireless communication link with a communications network and means for establishing a second wireless communication link with a second display device. After splitting the payload into a plurality of data packets, the first display device forwards at least one of the data packets to the second display device having different display capabilities.

The image data received by the mobile terminal comprises data to be ultimately reassembled into an image to be displayed on a display either on the mobile device, on an another display device, or on both of these devices. Because the mobile device may or may not have a display, and at best, will have a relatively small display on which it is difficult to view the image, the image data is retransmitted using a short range RF link, such as Bluetooth link, to an external display device for improved viewing quality. The improved viewing quality also enables a service provider to provide more advanced and better quality services to customers, such as images and/or video movies with higher quality resolution than could be effectively displayed on an ordinary display of a mobile phone.

The image data received by the mobile terminal is included within the first packet or a plurality of packets of a type appropriate to the wireless transmission method used. In addition to the data to be forwarded to the external display device, the packets received by the mobile terminal may contain data that may be used exclusively at the mobile terminal, such as voice data, control data, image data, or data for a displayable menu for the mobile terminal. The mobile terminal may have an application that splits the data packets received by the mobile device and forwards part of the data to the mobile terminal's own display and another part of the data for transmission with a short range RF link in an appropriate format to the external display device. At the external device, the short range RF data packets are reassembled into an image or video, as originally sent, for viewing on the external display device.

Other objects and features of the present invention will become apparent from the following detailed description considered in conjunction with the accompanying drawings. It is to be understood, however, that drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawings wherein like reference numerals denote similar elements throughout the several views.

DETAILED DESCRIPTION OF THE PRESENTLY PREFERRED EMBODIMENTS

The present invention may be implemented in conjunction with a wireless communications network using any wireless transmission methods, such as known methods like GSM (Global System for Mobile Communications), EDGE (Enhanced Data Rates for GSM Evolution), WCDMA (Wideband Code Division Multiple Access), DAB (Digital Audio Broadcasting) or DVB (Digital video broadcasting); although technologies with faster data transmission rates, like EDGE, WCDMA or DVB are preferred over GSM and DAB technologies.

Figure 1A:
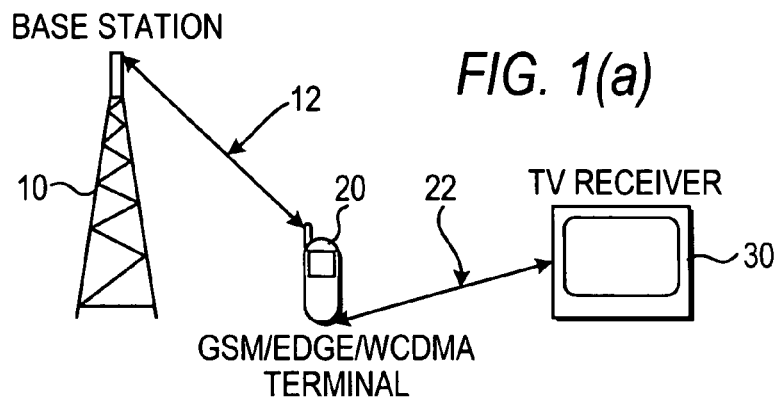
FIG. 1(a) is a schematic representation of a base station, mobile phone and an external display device.
Figure 1B:
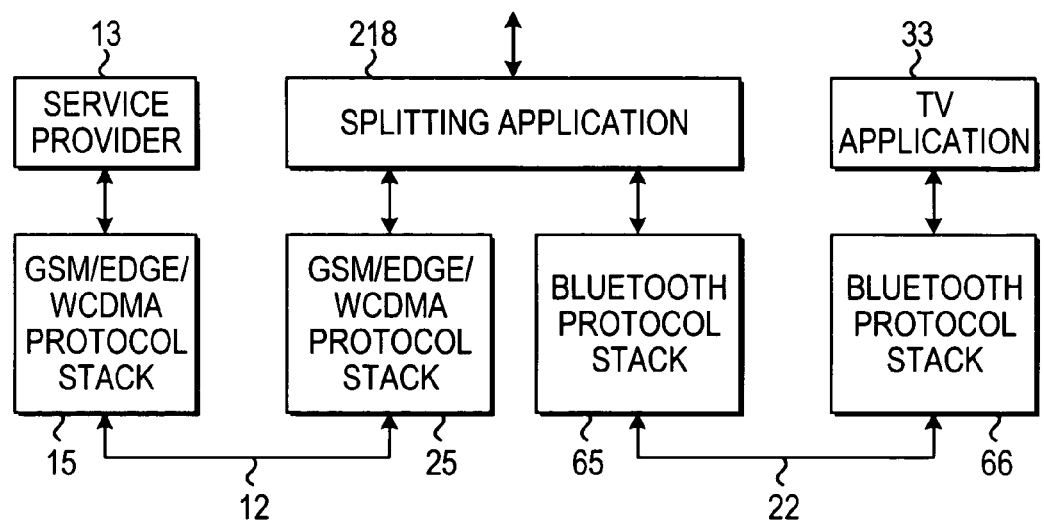
FIG. 1(b) is a block diagram of the basic protocol path from base station to television receiver, that may be used in practicing the present invention.

In FIG. 1(a) is shown the basics of this invention. A conventional wireless connection has a wireless link 12 between the base station 10 of a service provider 13 and the mobile terminal 20 to exchange the conventional radio frequency (RF) signals that pass between the base station 10 of a service provider 13 and the mobile terminal 20. Signals may be received by and transmitted to base station 10 from the mobile terminal 20. A protocol stack 15 specific to the transmission method used at the base station 10 handles the transmission and a similar protocol stack 25 at a mobile terminal 20 handles the received signal as shown in FIG. 1(b). A wireless short range RF link 22, e.g., a Bluetooth link, is also established between the mobile terminal and external display device, like a television receiver 30 or a computer monitor. This requires that the mobile terminal can establish this short range RF link. The Bluetooth link can be established with a Bluetooth chip manufactured according to the Bluetooth Specification Version 1.0B and standards (available on the internet at the "bluetooth.net" Web site).

In one implementation, a Bluetooth chip is connected to the printed circuit board of the mobile terminal 20. The external display must also be outfitted with a Bluetooth chip, which may be installed on the printed circuit board of the external display device (television receiver 30 in this example), or may be otherwise connected to the display device, such as with an external device plugged in to the display device (not shown in FIG. 1(a)).

The Bluetooth link 22 does not require the mobile terminal 20 and the TV 30 to be within direct line-of-sight with each other, but the devices must be inside the transmission/reception range of the Bluetooth chips for the signal from the mobile terminal 20 to be received in the TV 30. As earlier stated, the operating range of Bluetooth using normal 0 dBm transmission power is approximately 10 meters, which presents no problem for mobile terminal users who wish to view video on a television display and be able to control the video content with the terminal because users rarely watch television at distances farther than 10 meters. The Bluetooth standard presently supports an asynchronous data channel, as many as three synchronous voice channels, or a channel, which simultaneously supports asynchronous data and asynchronous voice. Associated with each of the Bluetooth chips at the mobile terminal 20 and the television receiver 30 is a multilayer Bluetooth protocol stack 65, 66, respectively, used for setting up and maintaining a Bluetooth link 22 between these Bluetooth-enabled devices.

Where video capabilities are provided, a conventional communication link 12 may be set up initially as an audio only call with the allowance for subsequent requests for video or link 12 may be initially set up to transmit audio and/or video. At the setup of service for mobile terminal 20, at a call setup, or at some other time, the base station 10 must be informed whether or not the mobile terminal 20 has a video capability or can transmit the video to a nearby Bluetooth enabled display device for viewing, and if so, the level of graphics that is enabled, such as whether high quality graphics can be received and viewed. A user may request that a radio signal containing video content be transmitted from the communications network via a base station 10 to mobile terminal 20. Alternatively, the base station 10 may simply begin transmitting a video signal when it has a video to send.

Although the discussion herein focuses on sending a combined audio and video signal, it should be understood that the invention is equally applicable to the transmission and handling of a video only signal or an audio only signal. It should be further understood that, rather than being transmitted from a base station, the signal may be transmitted to a mobile terminal from a short range RF-enabled device over a short range RF or other wireless link.

To handle a video feed that has a packet size larger than a single data frame, the mobile terminal 20 must receive a data stream from the service provider in a format wherein the video can be split into several data frames. Thus, basic information/control data may be sent by the service provider in a first data frame and the high quality graphics signal is split up, and transmitted thereafter as additional data frames.

Figure 2:
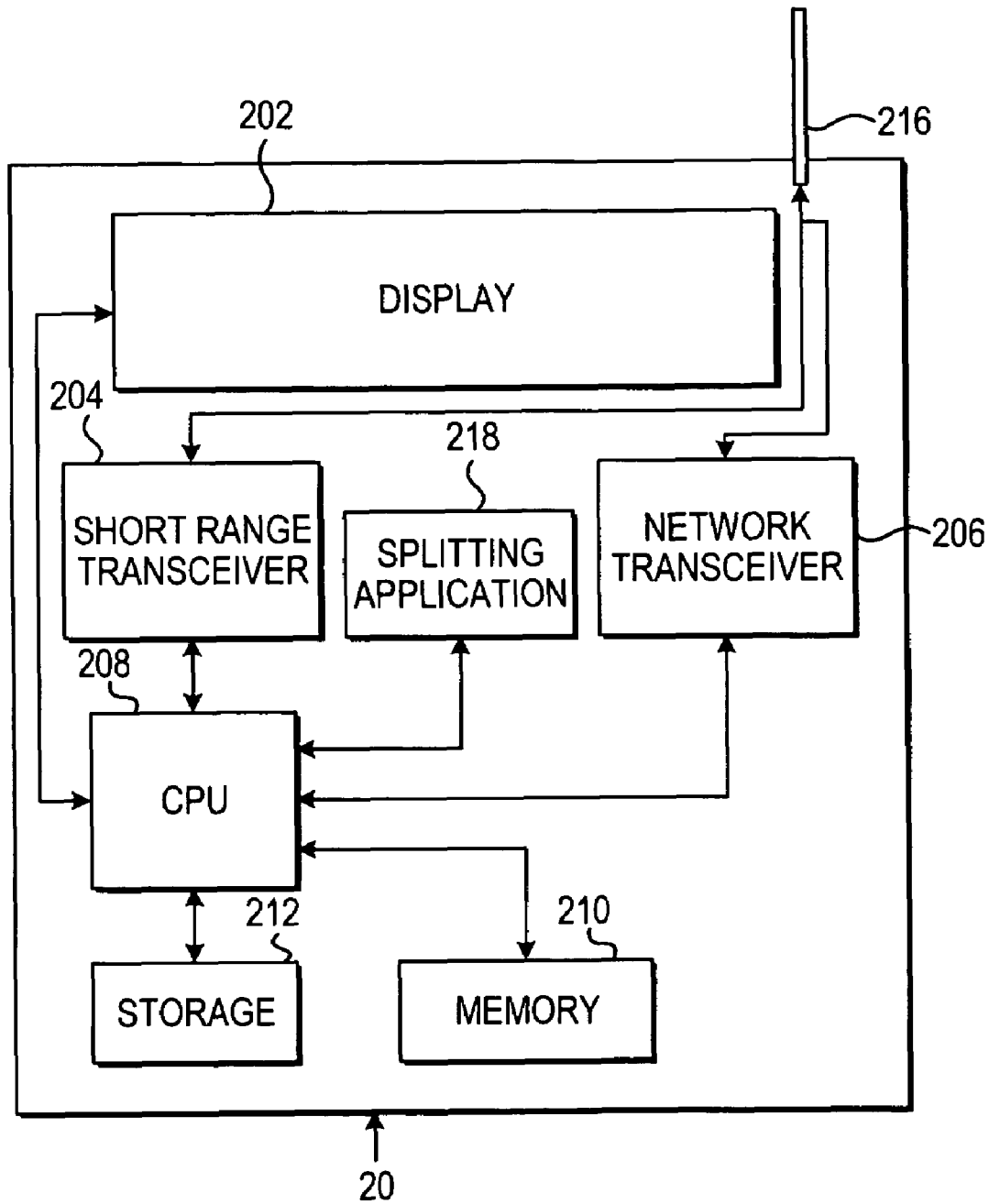
FIG. 2 is a simplified picture illustrating the structure of the mobile terminal in the view of this invention.

FIG. 2 shows a simplified picture of a mobile terminal 20 illustrating necessary components to perform the procedures of this invention. In the mobile terminal 20 there is a network transceiver 206, to receive transmissions from and to transmit requests to the wireless communications network, a short range transceiver 204 to enable communication with nearby devices, a CPU 208 unit for controlling and executing all necessary procedures, a memory unit 210, a storage unit 212, a display 202 for displaying the images, and an antenna 216. In the case of DVB or DAB, the terminal must also have a DVB or DAB receiver (not shown). Also, inside or outside the CPU unit is a software-based splitting application 218, which enables the handling and splitting of the different data frames.

Figure 3:
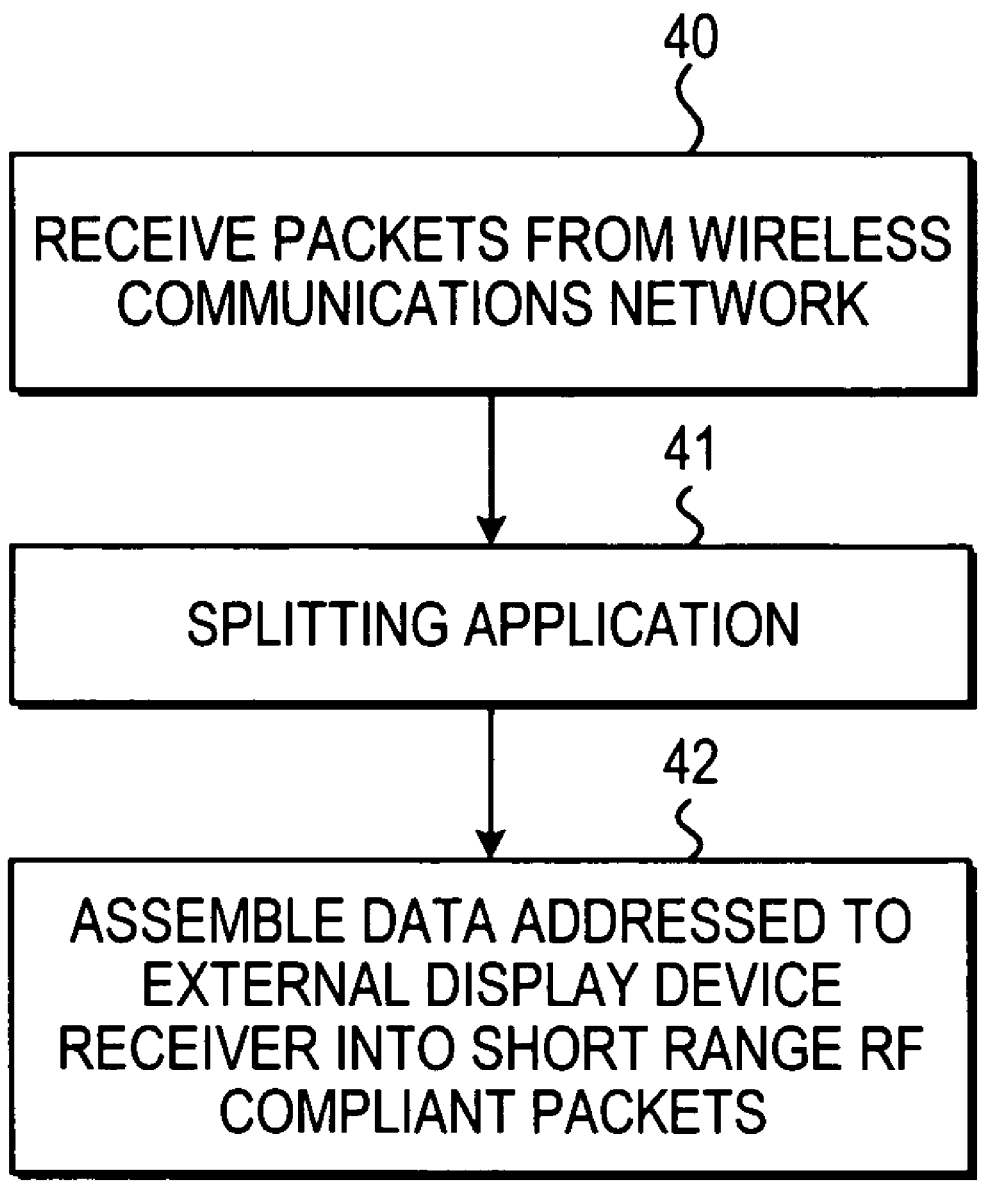
FIG. 3 is a flow chart of the method for handling the video data to be retransmitted to the external display device at the wireless device.
Figure 4A:
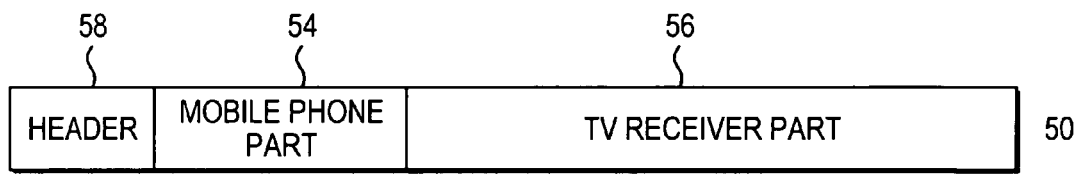
FIG. 4(a) is a plan view of a first possible data frame structure for transmitting a combined audio and video signal.
Figure 4B:
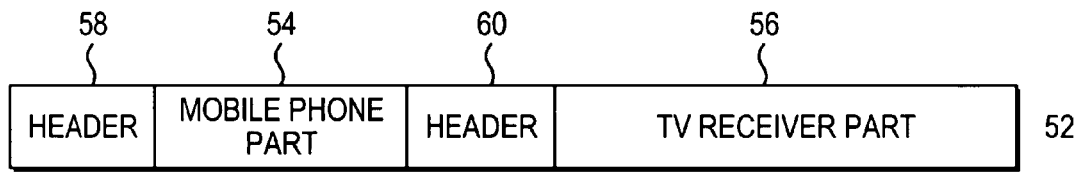
FIG. 4(b) is a plan view of a second possible data frame structure for transmitting a combined audio and video signal.

FIG. 3. shows a flow chart illustrating the method for handling the video data to be sent from the service provider 13 to the external display device 30 via mobile terminal 20. At step 40, the service provider 13 transmits data frames as packets to mobile terminal 20 over the wireless communications network which are received by mobile terminal 20. Where both audio and video are sent simultaneously via the packets, a packet containing video information may have a data frame structure that can be split into a mobile terminal part 54 and external display device part 56. Two possible basic data frame structures are data frame structure 50 shown in FIG. 4(a) and data frame structure 52 shown in FIG. 4(b). Mobile terminal part 54 may include any voice data to be heard over or otherwise used by the mobile terminal 20 as well as images, call feature or other data to be used by the mobile terminal such as textual information, caller-ID, e-mail, and the like, to be displayed on a display of the mobile terminal 20. External display device part 56 is the part to be forwarded to the external display device 30 and generally follows the mobile terminal part 54 within the signal sent by a base station 10 to allow the mobile terminal part 54 to be split off first and used by the mobile terminal 20. The external display device part 56 generally includes a video portion of the signal and may include an audio portion to be played with the video on the external display device. In data frame structures 50, 52 a header part 58 precedes mobile terminal part 54. In data frame structure 52, a separate header part 60 also precedes the external display device part 56. The precise length of the mobile terminal part 54 and the external display device part 56 will depend on the currently utilized transmission method, i.e. GSM, EDGE, WCDMA, DAB, DVB, Bluetooth or some other method. The external display device part 56 is transmitted from the mobile terminal to the external display device, such as a TV 30, over wireless short range RF link 22, such as Bluetooth link. It should be noted that the various parts of the data frame structures 50, 52 shown in FIGS. 4(a) and 4(b) are not necessarily drawn to scale.

Figure 5:
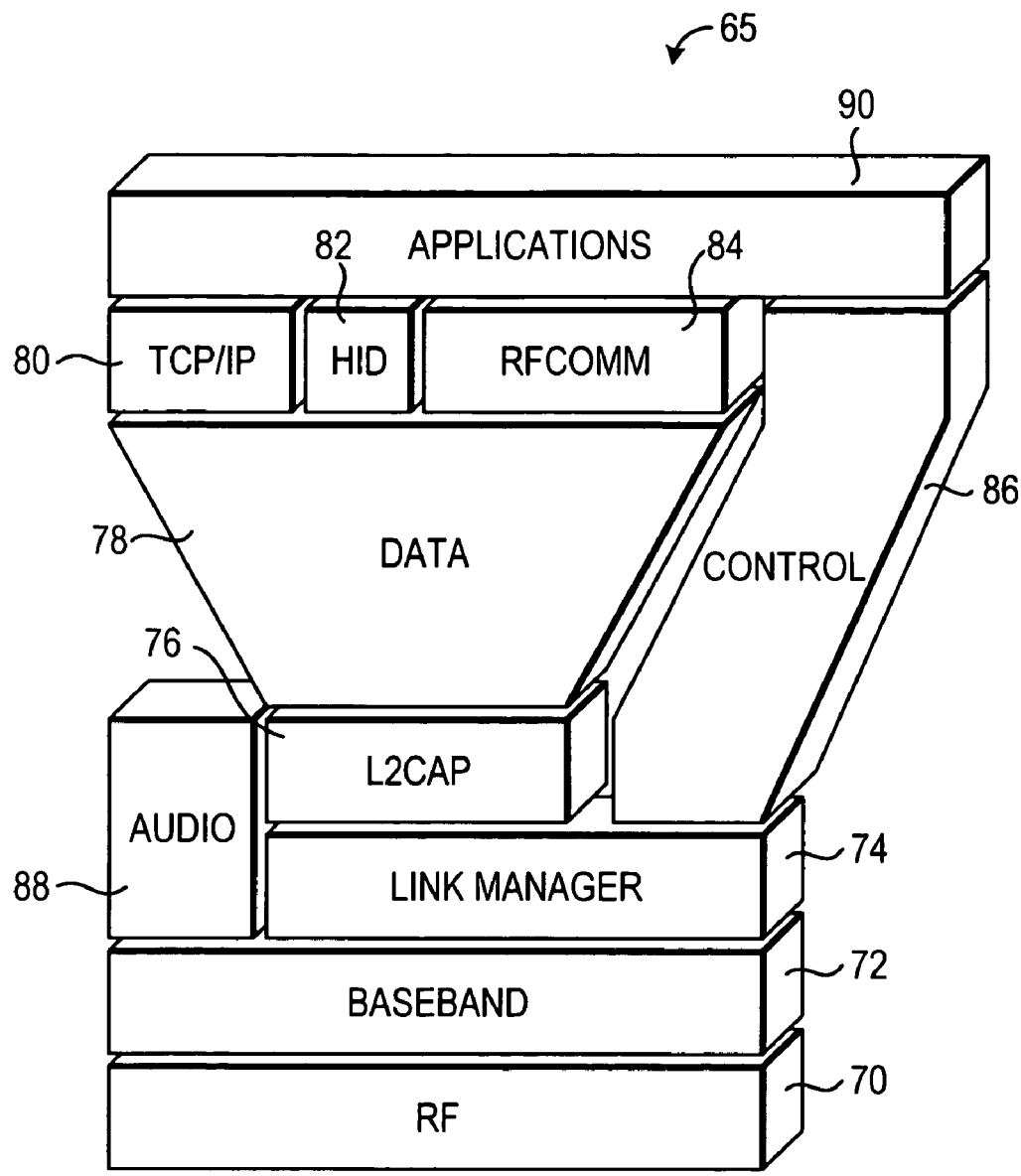
FIG. 5 is a schematic representation of the Bluetooth protocol stack.

In one preferred embodiment of this invention the short range RF link 22 is specified as a Bluetooth link and thereby the protocol stack considered in this invention is a Bluetooth protocol stack. The features of that particular Bluetooth protocol stack are shown in FIG. 5, and the various layers of the protocol stack (65, 66 in FIG. 1) at mobile terminal 20 and at external display device 30 are discussed in the Bluetooth Specification v.1.0B. The lowest layer is the radio layer 70, which provides an interface between the host devices and the Bluetooth chip. Above the radio layer is the baseband layer 72 which specifies the procedures to support the exchange of real-time voice and data information streams and networking between Bluetooth devices. Above the baseband layer 72 is the Link Manager 74 which is used for link set-up, security and control. The Logical Link Control and Adaptation Protocol (L2CAP) layer 76 supports higher-level protocol multiplexing, packet segmentation and reassembly, and conveying the quality of service information. An Applications layer 90 is the highest layer in the Bluetooth protocol. Data 78 passes between the L2CAP layer 76 and the Applications layer 90 via one or more of the following interfaces: TCP/IP 80, HID (human interface device/host interface device) 82, or RFCOMM 84 (discussed at Part F1 of the Bluetooth Specification). A control sequence 86 passes between the Link Manager 74 and Applications layer 90 to set up the Asynchronous Connection Link (ACL) between Bluetooth devices and provides a pathway for the Applications layer 90 to send control information, such as to notify Link Manager 74 that a packet was lost. An audio component 88 of the multilayer protocol stack 65 handles any audio to be transmitted to the external display device.

Returning to the method of FIG. 3, at step 41, the mobile terminal's splitting application 218 (shown in FIG. 1(b)) is used to split the mobile terminal part 54 from the external display device part 56 at the Applications layer 90. (As an alternative to implementing the splitting application 218 at the Applications layer 90, data can be processed and delivered through the RFCOMM protocol or another layer in the protocol stack.) The splitting application 218 takes a data frame from a data stack (not shown) at mobile terminal 20 received from base network 10 over communications link 12 and determines where the external display device part 56 is located within the data frame structure by knowing the fixed length of the mobile terminal part 54. If data frame structure 52 is used, the separate header part 60 indicates the location of the external display device part 56. To provide time for the splitting application 218 to handle the incoming data from the network, the received signal is buffered at the mobile terminal 20 in a buffer (not shown). Once the data is split, at step 42, the external display device part 56 is further processed by the Bluetooth protocol stack 65 at the mobile terminal 20 where one or more external display device parts are reassembled into one or more Bluetooth compliant packets formed in accordance with the Baseband Specification within the Bluetooth Specification, the number of such packets depending on the amount of data to be sent.

Figure 6:
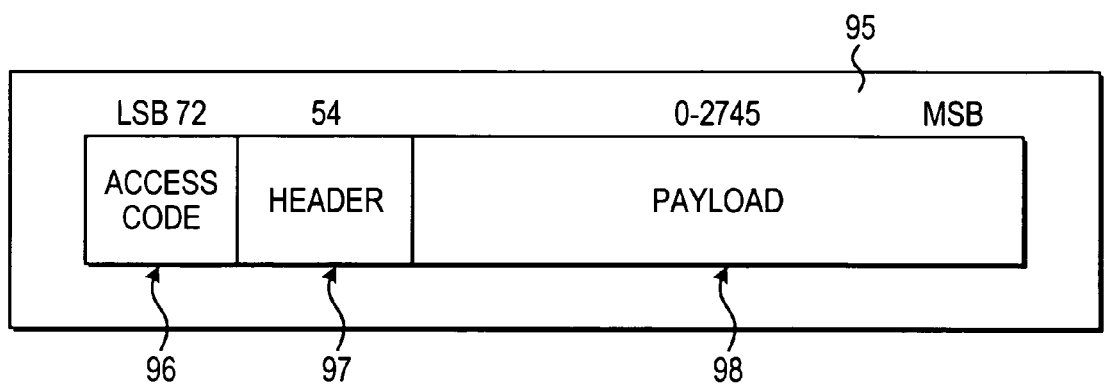
FIG. 6 is a plan view of the standard Bluetooth packet format.

Referring to FIG. 6, each Bluetooth packet 95 comprises an access code 96 specific to a master's address in the connection mode and identifying each packet in one piconet, a header 97 containing link control information, and a payload 98, which comprises one or more external display device parts 56 or a portion of an external display device part, the organization of the data into Bluetooth packets depending on the size of external display device part 56 and the size of the payload 98. These packets 95 are placed into a data stack within the Bluetooth chip and are then ready to be transmitted to external display device 30. The various parts of Bluetooth Packet 95 shown in FIG. 6 are not necessarily drawn to scale.

A wireless link 22 to send data between mobile terminal and external display device 30 is established using the Bluetooth protocols. The mobile terminal must be set up as the "master" to control the communication with the external display device 30 which is a "slave". The master and slave communicate over shared channel and form a "piconet". The channel is defined in the Bluetooth Specification as a pseudo-random hopping sequence through the defined RF channels that is unique to the piconet.

Generally, the mobile terminal 20 becomes the master automatically when video service is ordered with the mobile terminal 20 and the connection to external display device 30 is initiated. However, if the external display device 30 is set up as the master, for any reason, the master and slave must exchange roles, with the slave becoming the master and vice versa, i.e. a master-slave switch is performed in accordance with the Bluetooth Specification.

Figure 7:
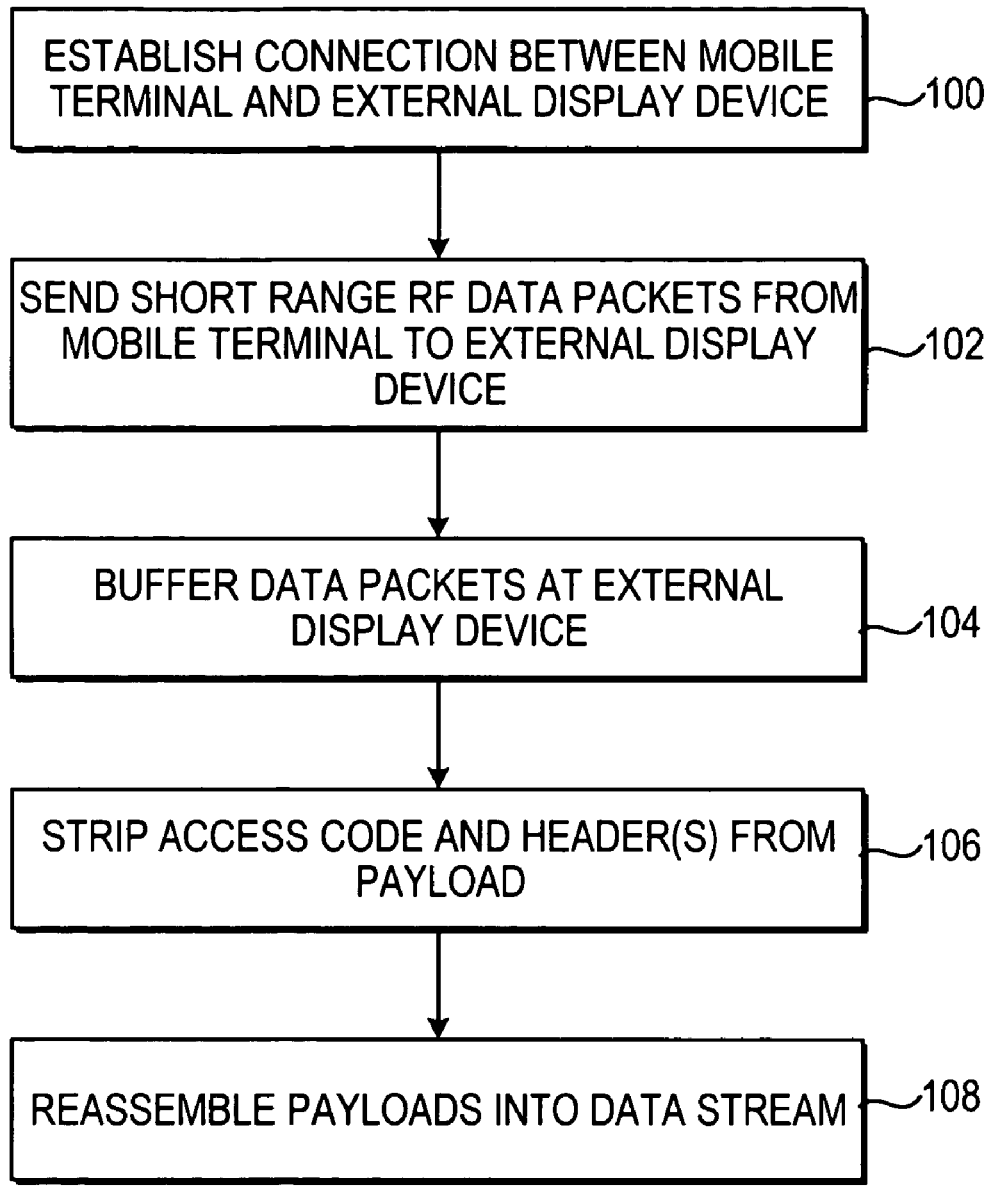
FIG. 7 is a flow chart of the method of transmitting video data from the wireless device to the external display device.

Referring now to the flow chart of FIG. 7, at step 100, the connection is initialized by mobile terminal 20 which serves as a master. If an external display device 30 has been previously identified with a specific device address to the master (mobile terminal), which is the case when the same master-slave relationship was previously set up, the master usually transmits a "Page Scan" command to page the known Bluetooth unit within the external display device 30. (If the master-slave relationship was previously established and was maintained in "park" mode, there is no need to set up a new connection; a command must only be sent to exit "park" mode to restart the communication.) If no such external display device 30 has been previously identified to mobile terminal 20 as a master, the mobile terminal 20 broadcasts an "Inquiry" message to determine what other Bluetooth units are within the coverage area wherein two Bluetooth units can exchange messages with acceptable quality and performance. The Bluetooth units that capture the broadcast "Inquiry" messages will send a response to the mobile terminal 20 providing information about the responding Bluetooth unit and its host device, which would include any Bluetooth-enabled external display device in the coverage area. After locating the external display device, a "Connection" state is established in which the mobile phone 20 is the master and the external display device 30 is the slave, thereby preventing the external display device from receiving data from multiple Bluetooth devices at the same time, which could cause problems with the display on the device.

During the Connection state, the Bluetooth-compliant packets formed at the mobile terminal 20 are sent to the external display device 30 (step 102). Upon receipt at external display device 30, the packets are buffered at buffer (not shown) having a sufficient memory for the data stream (step 104), and the packets are stripped of the access code 96 and header parts 97 (step 106) and the payloads 95 of the various packets are then reassembled by the Bluetooth protocol stack 66 at the external display device 30 into a data stream to be played, whether as video only or with audio available (step 108). The buffer is necessary both to compensate for variations in the transmission speed of the packets and to capture multiple packets before reassembly into a video signal to be displayed. If the television receiver has a memory (which is becoming common to enable closed captioning of broadcasts and other text-based services), it is also possible to utilize the memory of the television receiver for buffering purposes. The video delivered to the external display device 30 (in this particular case the television) may be delivered at a much faster rate than the rate at which it can be delivered to a conventional, slow mobile terminal display.

Figure 8:
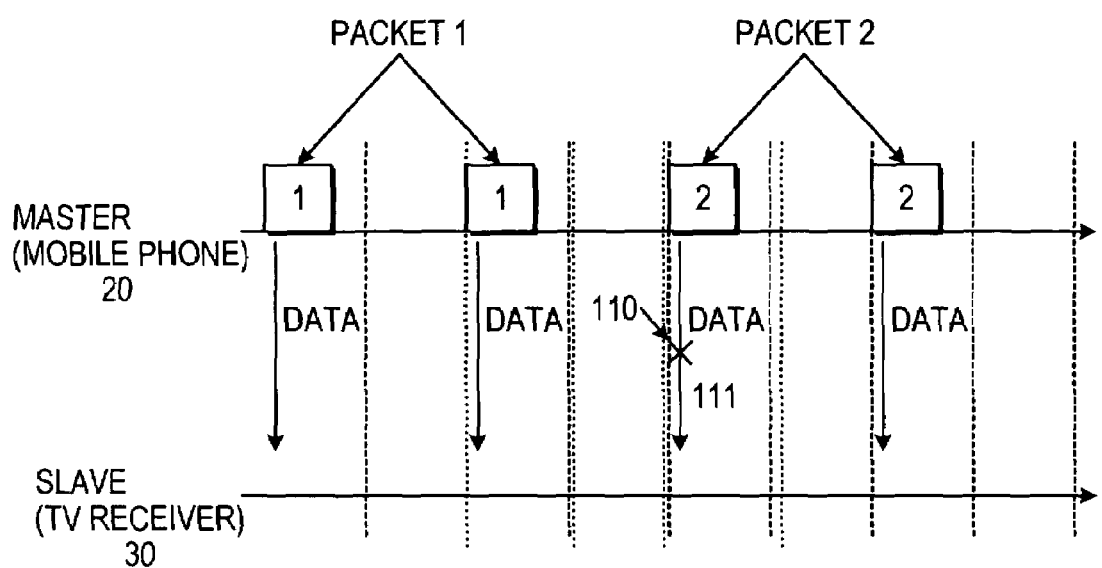
FIG. 8 is a diagrammatical view of a method for broadcasting the video packets from the mobile device to the external display device.

The packets are sent to the external display device 30 at step 102 in one of various ways, such as the methods defined in the Bluetooth Specification. According to one "broadcasting with repetition" scheme, each packet is broadcast a predefined number of times, such as five times. For example, a first packet is broadcast five times, then a second packet is broadcast five times, etc. This increases substantially the chance that a packet will be received without error and offers the advantage that the slave, external display device 30 need not send any acknowledgements to mobile terminal 20. An example of the "broadcasting with repetition" scheme is shown in FIG. 8 where each packet is broadcast two times. Data is sent via packet 1 from mobile phone 20 to television receiver 30 twice. Both times it is received correctly. Next, packet 2 is sent twice. As illustrated, the first time packet 2 is sent it is not received properly, for whatever reason, as represented by an "x" 110 over arrow 111.

Figure 9:
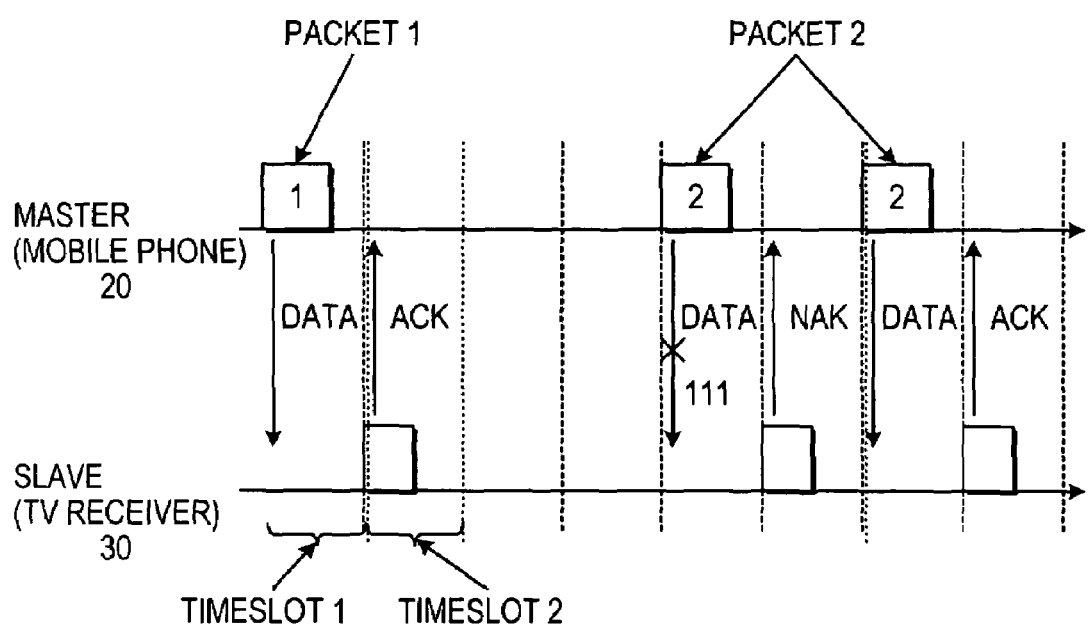
FIG. 9 is a diagrammatical view of a method for transmitting the video packets from the mobile device to the external display device using a specific polling scheme.

According to a second, more reliable scheme for sending packets to the television receiver 30, shown in FIG. 9, packet 1 is sent and no further packets are sent until the television receiver sends an acknowledgement (ACK) to the mobile phone 20 that the packet was received. In this "polling" scheme, an ARQ (Automatic Repeat Queuing) protocol may be used. Certain time slots/intervals are designated as times when the master may transmit a packet and the following time slot is designated as a slave-to-master slot when the slave answers. Thus, FIG. 9 shows packet 1 being transmitted by mobile phone 20 during first time slot and an ACK signal is returned by television receiver 30 during the next time slot. Packet 2 is subsequently transmitted during another time slot but is not properly received. Thus, a NAK (No Acknowledgement) signal is sent back by television receiver 30 during the next time slot and mobile phone 20 then resends packet 2 until proper receipt is acknowledged with an ACK signal. After all packets are sent, the Connection state may be terminated and both the master and slave devices return to the Standby mode. In this mode, the Active Member Address of the slave is released, enabling the slave to connect with another Bluetooth device.

The invention may also be implemented in conjunction with the Wireless Application Protocol (WAP) such that the data that passes to the external display device is ordered and controlled via WAP. The convergence of WAP and Bluetooth technologies is defined in the Bluetooth Specification. WAP provides Internet and advanced telephone services to mobile terminals and allows among other things a mobile terminal user to interact with the user's service provider. WAP also permits the download of menus from the network to mobile terminal 20 offering various selections that a user can make. WAP permits a mobile terminal user to order data to be sent to an external display 30 device from a menu of one or more choices that appears on a display on the mobile terminal. The ordered data, as well as related data for controlling the data for the external display device 30, is then sent from the service provider 13 via network and its base station 10 to the mobile terminal 20. WAP further controls the delivery of the ordered data to external display device 30. The data that will be sent to the external display device 30 is extracted before the WAP menu or any other application is displayed on the display of the mobile terminal 20. The extracted data is then streamed through the mobile terminal 20 and transmitted to the external display device 30. The menus and related data viewed on the display of mobile terminal 20 may also be sent to the external display device 30 so that the menu can be displayed and better viewed thereon, the selection may be made on the external display device 30 and then transmitted back to the mobile terminal 20.

Rather than sending video data over the same channel as other data used exclusively by the mobile terminal 20, it is possible in WCDMA and similar wireless technologies where there are multiple channels per user to send the data bound for the external display device over a "dedicated" channel to transmit this data via mobile terminal and over the short range RF link to external display device.

Because of the improved display quality, many new mobile communications services are possible. For example, using mobile terminal and a WAP menu, a user can send a request to a service provider 13 for a weather report for Helsinki city. After sending the request, the user receives a data stream from the service provider 13 via communications network to his/her mobile terminal 20, that may consist of basic information about the current weather in Helsinki and a live or satellite picture of Helsinki, a weather map, or a detailed graphical illustration of the weather forecast for Helsinki city. The basic information can be displayed on the display of the mobile 30 terminal 20 and pictorial data may be forwarded to the external display device, such as a television receiver, for better viewing.

It should also be understood that, when a television receiver is used as an external display device 30 and the display is controlled with a Bluetooth data stream, the display of the television receiver can be controlled pixel-wise, i.e. the display can be divided into different portions, which can each be separately controlled. This allows advertising to be added to the transmission and displayed on one or more portions of the display. For example, when the user wants to see a picture of the weather in Helsinki city, the transmission includes a banner that advertises British Airways. An advertisement on a particular portion of the display may remain displayed until other data to be displayed in that location is received.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of this invention. Moreover, it should be recognized that structures and/or elements and/or method steps shown and/or described in connection with any disclosed form or embodiment of the invention may be incorporated an any other disclosed or described or suggested form or embodiment as a general matter of design choice.

I claim:

1. An apparatus comprising:
   a processor;
   a memory coupled to the processor and configured for storing data provided by the processor;
   a splitting application configured to split received data including at least first image information and second image information into at least two data parts based on headers in the received data, wherein the first image information and the second image information are for displaying at least two substantially different images;
   a wireless short-range transmitter coupled to the processor and configured to transmit at least one of the at least two data parts wirelessly to an external display device for displaying images corresponding to at least the first image information; and
   a display coupled to the processor and configured for receiving at least one data part not transmitted by the wireless short-range transmitter and displaying images corresponding to at least the second image information,
   wherein the images displayed on the external display device and the display coupled to the processor are substantially different.

2. An apparatus according to claim 1, further comprising a receiver for receiving a signal comprising data including at least the first image information and the second image information.

3. An apparatus according to claim 2,
   wherein the receiver is a wide-area network receiver.

4. An apparatus according to claim 2,
   wherein the memory comprises a buffer adapted to buffer the received signal to provide time for the splitting application to split the received data into the at least two parts.

5. An apparatus according to claim 1,
   wherein the processor is configured to forward to the display coupled to the processor the at least one part of the received data that is not transmitted to the external display device.

6. An apparatus according to claim 1 wherein the apparatus is a mobile terminal.

7. A method comprising:
   obtaining data, including at least first image information and second image information, in frames;
   splitting the obtained data into at least two data parts based on headers in the obtained data, wherein the first image information and the second image information are for displaying at least two substantially different images; and
   transmitting at least one of the at least two data parts wirelessly to an external display device for displaying images corresponding to at least the first image information,
   wherein a coupled display is configured to receive at least one data part not transmitted wirelessly and display images corresponding to at least the second image information, and
   wherein the images displayed on the external display device and the coupled display are substantially different.

8. A method according to claim 7,
   wherein the obtained data is received from a receiver.

9. A method according to claim 8 further comprising:
   buffering a received signal to provide time for a splitting application in a mobile terminal to split obtained data into the at least two parts.

10. A method according to claim 7 further comprising:
    forwarding to a display of a mobile terminal a part of the split data that is not transmitted to the external display device.

11. A method according to claim 7, wherein one or more of the obtaining, the splitting, and the transmitting is performed by a mobile terminal.

12. A system comprising a mobile terminal and an external display device,
    wherein the mobile terminal comprises a processor; a memory coupled to the processor and configured for storing data provided by the processor; a splitting application configured to split received data including at least first image information and second image information into at least two data parts based on headers in the received data, wherein the first image information and the second image information are for displaying at least two substantially different images; a wireless short-range transmitter coupled to the processor and configured to transmit at least one of the at least two data parts wirelessly to an external display device for displaying images corresponding to at least the first image information; and a display coupled to the processor and configured for receiving at least one data part not transmitted by the wireless short-range transmitter and displaying images corresponding to at least the second image information, wherein the images displayed on the external display device and the display coupled to the processor are substantially different.

13. A system according to claim 12 further comprising a receiver for receiving a signal comprising data including at least the first image information and the second image information.

14. A mobile terminal according to claim 13 wherein the receiver is a wide-area network receiver.

15. A system according to claim 13 wherein the memory comprises a buffer adapted to buffer the received signal to provide time for the splitting application to split the received data into the at least two parts.

16. A system according to claim 12, wherein the processor is configured to forward to the display coupled to the processor the at least one part of the received data that is not transmitted to the external display device.

* * * * *